United States Patent [19]

Ito

[11] 3,841,193
[45] Oct. 15, 1974

[54] FASTENING DEVICE
[75] Inventor: Akira Ito, Yokohama, Japan
[73] Assignee: Tokyo Shibaura Electric Company, Ltd., Kanagawa-ken, Japan
[22] Filed: June 2, 1972
[21] Appl. No.: 259,041

[52] U.S. Cl............................ 85/9 R, 85/1 T, 85/62
[51] Int. Cl............................................. F16b 35/06
[58] Field of Search........... 85/32 R, 32 T, 9 R, 1 T, 85/62

[56] References Cited
UNITED STATES PATENTS

| 2,571,265 | 10/1951 | Leufven | 85/32 R |
| 3,130,628 | 4/1964 | Blinn | 85/1 T |
| 3,462,180 | 8/1969 | Bunyan | 85/32 R |
| 3,463,044 | 8/1969 | Rossman et al. | 85/32 R |

FOREIGN PATENTS OR APPLICATIONS

| 991,783 | 5/1965 | Great Britain | 85/62 |
| 1,136,280 | 12/1968 | Great Britain | 85/9 R |

Primary Examiner—Edward c. Allen
Attorney, Agent, or Firm—Oblon, Fisher, Spivak, McClelland & Maier

[57] ABSTRACT

A fastening device for high pressure turbine and pump casings comprising an elongated bolt externally threaded at both ends for threaded engagement with securement nuts. Internally of the elongated bolt is a fluid passageway for conducting pressurized fluid from an external source to a chamber internal of the fastening device. In assembling the fastening device relative to turbine or pump casings, the bolt is inserted within an opening of the casings and is secured relative thereto by a first and second securement nut. Pressurized fluid is then introduced into the internal chamber of the assembly, the fluid causing the bolt to elongate. When the bolt has elongated a predetermined amount, the second securement nut is tightened to the bolt, the pressurized fluid withdrawn allowing the bolt to contract thereby securely fitting together the turbine or pump casings.

4 Claims, 2 Drawing Figures

FASTENING DEVICE

BACKGROUND OF THE INVENTION

The present invention relates generally to fastening devices and more particularly to an improved fastening device for high pressure casings.

Fluid turbines and pumps utilized for example in turbogenerators and similar power-plants, normally involve machinery of monumental size. The housings or casings for such machinery being extremely large, it is usually necessary or desirable to erect the casings in sections. In order to secure the casing sections together, large nut and bolt assemblies, on the order of 100–200 mm. in diameter are conventionally employed. It has been found however, that the stability of simple nut and bolt assembly connections, without more, rapidly deteriorate due to the tremendous operating pressures placed upon the structural components.

One type of fastening apparatus currently employed for enhancing the stability of such nut and bolt assemblies comprises shrink fitting the assemblies together, relative to the casing walls, by the use of large electric heaters. In utilizing this apparatus, the heaters are inserted within the bolts along their longitudinal axes, and due to the large amount of heat emitted by the heaters, the bolts expand. While in this heated and expanded condition, the nuts are appropriately secured to the bolts, after which the heaters are removed from the bolts. Removal of the heaters accordingly permits the bolts to cool, the cooling process resulting in a contraction of the bolts and the consequent shrink fit.

While this conventional apparatus for fastening together the fluid turbine or pump casing walls somewhat enhances the stability of the casing connections, it is nevertheless subject to serious objections in that the electric heaters employed must necessarily be of sophisticated and intricate design, the breakdown of which is both costly and time-consuming.

Still further, the use of such conventional equipment is extremely expensive since the heaters are both costly to manufacture and use and since the life span of such heaters is relatively short.

Yet further, while the use of this conventional equipment involves the intended longitudinal expansion of the fastening bolts, the large amount of heat generated by the heaters may create other undesirable expansions and stresses which tend to deleteriously affect the structural components of the assemblies.

SUMMARY OF THE INVENTION

Accordingly, it is an object of the present invention to provide an improved fastening device for fluid turbine and pump casings.

Another object of the present invention is to provide an improved fastening device for fluid turbine and pump casings which is structurally simple and reliable.

Still another object of the present invention is to provide an improved fastening device for fluid turbine and pump casings having great stability, and which is able to withstand the tremendous operational pressures placed upon the system without serious deterioration.

Yet another object of the present invention is to provide an improved fastening device for fluid turbine and pump casings which will greatly decrease operational costs.

It is a further object of the present invention to provide an improved fastening device for fluid turbine and pump casings which will not deleteriously affect other structural components of the system.

It is yet a further object of the present invention to provide an improved fastening device for fluid turbine and pump casings which produces a strong connection capable of withstanding high pressure without the disadvantages present in conventional apparatus, as noted heretofore.

The foregoing objectives are achieved according to this invention through the provision of a fastening device for fluid turbine and pump casings comprising a cylindrical bolt, having a circular flange disposed thereon adjacent to but spaced from one end thereof, such as to provide a t-shaped configuration when viewed in vertical cross-section, which is to be inserted through an elongated opening in the casing walls, the bolt being externally threaded along one end part of its length for securement with an appropriate nut. At the other end of the bolt, there is located a fluid passageway skewed with respect to, and laterally offset of, the longitudinal axis of the bolt, the bolt being externally threaded along the end part of its length also, for securement with a second nut. An annular contact shoulder serves as a guide-bearing for the flange of the bolt, and also as a supporting surface for the second-mentioned securement nut. In assembling the fastening device, the bolt is inserted through the opening in the casing walls, the flange of the bolt being simultaneously guided within the supporting shoulder. Upon insertion of the bolt, the first and second nuts are secured, at the conclusion of which pressurized fluid, such as for example, oil, is introduced into the fluid passageway. Introduction of the fluid causes elongation of the bolt in a direction opposite to the direction in which the bolt was inserted within the casing walls. When a predetermined amount of elongation has been attained, the second nut is tightened to the bolt, the nut being screw-threaded upon the bolt to such an extent that it ultimately engages and is supported by the supporting contact shoulder, thereby preventing contraction of the bolt to its original position when the pressurized fluid is withdrawn. The tendency of the bolt to contract to its original position of course results in the shrink fitting together of the component parts of the fastening device.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

3

DETAILED DESCRIPTION OF THE PREFERRED EMBODIMENTS

Figure 1:
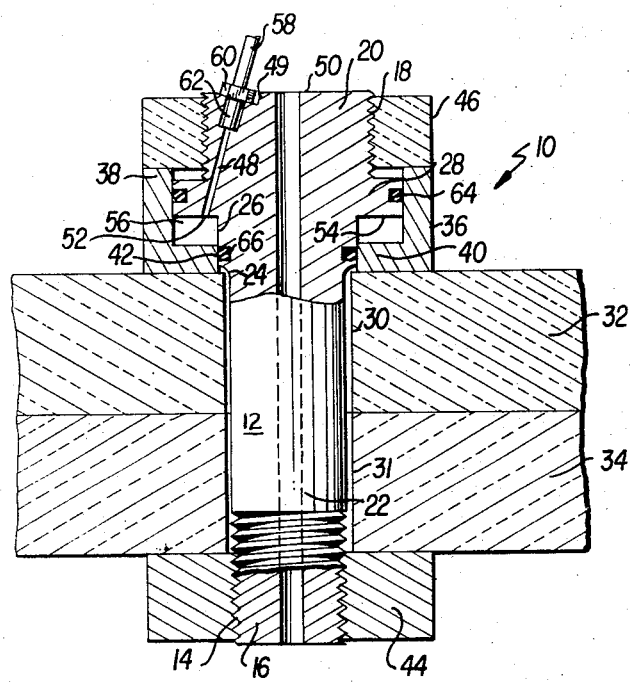
FIG. 1 is a partial cross-section view of one embodiment of an assembled fastening device constructed according to this invention and showing its cooperative parts.

Referring now to the drawings, and more particularly to FIG. 1 thereof, there is shown a fastening device for fluid turbine and pump casings generally indicated by the reference character 10 comprising an elongate, cylindrical, bolt 12 having a t-shaped configuration when viewed in vertical cross-section and being externally threaded at 14 along one end 16 of its length, and similarly externally threaded at 18 along the opposite end 20 of its length. Adjacent externally threaded portion 14 is a non-threaded shank portion 22, shank portion 22 terminating in an annular shoulder or seat 24. Annular shoulder or seat 24 is in the form of a truncated cone, the sides of which make an acute angle with the longitudinal axis of bolt 12 in the direction of bolt end 20.

A second cylindrical shank portion 26 lies adjacent the base of conical seat 24, shank 26 being of larger diameter than shank portion 22 by an amount equal to the radial or lateral dimension of seat 24. Shank portion 26 in turn terminates in a cylindrical, flange, or cross-bar portion of the bolt as it is viewed in vertical cross-section, 28, being positioned between shank portion 26 on one side, and externally threaded end portion 20 on the other side.

Still referring to FIG. 1, it is seen that bolt 12 is inserted through elongated longitudinally aligned openings 30 and 31 located in fluid turbine or pump casing walls 32 and 34, respectively, these walls being contiguous to each other and are the very walls to be secured together by the device of the present invention. Secured to casing wall 32 in any conventional manner is an annular contact shoulder 36, shoulder 36 being open at one end 38, and closed at the other end 40, closed end 40 however, having a central opening 42 for the insertion therethrough of bolt 12. It will also be noted upon reference to FIG. 1, that the diameter of opening 38 is just slightly greater than the diameter of flange 28, whereby flange 28 may be inserted through open end 38 of shoulder 36, the latter acting as a guide-bearing for flange 28, in a manner to be described more fully hereinafter.

Still referring to FIG. 1, it is additionally seen that the fastening device of the present invention also comprises a first securement nut 44, and a second securement nut 46, which are to be appropriately secured to the externally threaded end portions 16 and 20, respectively, of bolt 12. Furthermore, there is disclosed at 48, a tubular fluid passageway located internally of bolt 12. More particularly, fluid passageway 48 is seated within end face 50 of bolt end portion 20 at a position laterally offset of the longitudinal axis of bolt 12, and extends in a direction inclined with respect to the longitudinal axis of bolt 12, such that the longitudinal axis of passageway 48 makes an acute angle with the longitudinal axis of bolt 12 in the direction of bolt end 16. Passageway 48 ultimately terminates in an aperture 52 defined in the interior surface face 54 of flange 28, aperture 52 in turn leading into an annular fluid chamber 56 defined by the interior surfaces of shoulder 36, flange 28, and bolt shank portion 26, for a purpose to be more fully disclosed hereinafter. Fluid passageway 48 may in turn be connected to an external source of pressurized fluid (not shown), such as for example, oil, via a high-pressure tubular conduit 58. The connection may take the form, for example, of a conventional nut and sleeve assembly 60 and 62, sleeve 60 surrounding fluid passageway 48 and being located internally of bolt end portion 20, whereas nut 62 may be externally located with respect to bolt end portion 20, but nevertheless somewhat recessed as at 49 within its end face 50.

Still referring to FIG. 1, assembly of the fastening device of the present invention will be readily apparent. The bolt 12 is inserted through elongated openings 30 and 31 in fluid turbine or pump casing walls 32 and 34, respectively, until annular shoulder or seat 24 of bolt 12 abuts casing wall 32; simultaneously, cylindrical flange section 28 of bolt 12 will abut end portion 40 of annular contact shoulder 36. When these relative positions have been attained, first securement nut 44 is threadingly secured upon externally threaded end portion 16 of the bolt 12 until such nut 44 butts against casing wall 34.

High-pressure tubular conduit 58, leading from an external source of pressurized fluid (not shown) may then be coupled to tubular fluid passageway 48 per the associated nut and sleeve assembly 60 and 62, after which pressurized fluid, such as for example, oil, is conducted via conduit 58 and and passageway 48 into annular chamber 56. It will be noted that a pair of O-rings 64, 66 have been provided relative to chamber 56, i.e., on opposite sides of chamber 56, these O-rings acting as static seals which prevent any seepage of oil from chamber 56 to any other component parts of the fastening device in either direction. The rings are spaced apart in a general longitudinal direction corresponding to the longitudinal axis of the fastening device, O-ring 64 being particularly located centrally of cylindrical flange portion 28 of the bolt 12, while O-ring 66 is located within cylindrical shank portion 26 adjacent annular seat 24, of bolt 12.

As will be apparent, the introduction of the pressurized fluid into chamber 56 will tend to cause the retraction or withdrawl of the bolt 12 from its seated position within the casing walls 32 and 34 by the action of such fluid acting relative to cross-bar portion 28 and the interior face of contact shoulder end portion 40. Such withdrawl is of course prevented by first securement nut 44. Consequently, the bolt 12 is forced to elongate in a direction parallel to its longitudinal axis, bolt 12 being guided in its axial elongation by the relative engagement of flange portion 28 of bolt 12 and the interior face of annular contact shoulder 36, the latter acting as a guide-bearing for the former.

When a predetermined amount of elongation has taken place, second securement nut 46 is threadingly secured upon externally threaded end portion 20 of the bolt 12 until such nut 46 butts against the annular face of open end portion 38 of contact supporting shoulder 36. The pressurized fluid may then be withdrawn from chamber 56, the bolt 12 thereby tending to contract to its original position. Such contraction however, is of course prevented through the interaction of the bolt 12 and second securement nut 46 relative to contact supporting shoulder 36, such interengagement of these relative structural components resulting in the intended shrink fitting of the fastening device of the present invention with respect to the fluid turbine of fluid pump casing walls 32, 34.

Figure 2:
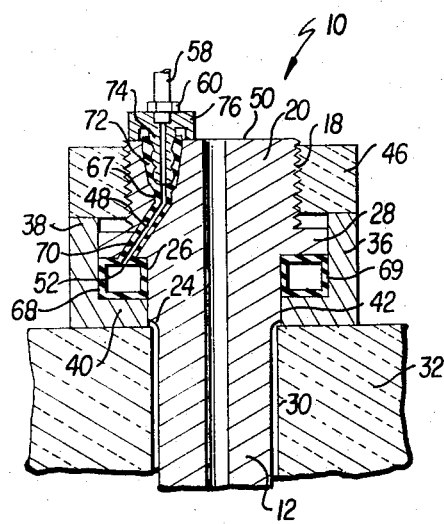
FIG. 2 is a partial cross-section view of a second embodiment of an assembled fastening device constructed according to this invention and showing its cooperative parts.

Turning now to FIG. 2 of the drawings, there is shown a second embodiment of the present invention. It will immediately be noted that in this embodiment, instead of static-seal O-rings 64 and 66, there has been positioned, externally of, but nevertheless in conjunction with, the bolt flange 28, an expansible, flexible, annular bladder or fluid chamber 68, which may be formed of rubber or other similar fluid-tight material, bladder 68 being able to conform to the shape of, and acting as a fluid containing liner for, cavity 69 when the fastening device is in its assembled mode. Hence, in this embodiment, static-seal O-rings 64, 66 are no longer required as no fluid is able to pass externally of flexible fluid chamber or bladder 68. In addition, integrally formed with bladder 68 is a sleeve 67 composed of a guide tube 70 which surroundingly engages fluid passageway 48, located internally of bolt 12 as heretofore discussed, guide tube 70 integrally terminating in a flared insert portion 72, similar to sleeve 62, seated within bolt end portion 20. Insert portion 72 makes an obtuse angle with respect to guide tube 70 and fluid passageway 48, the longitudinal axis of insert 72 being parallel to the longitudinal axis of bolt 12. Insert portion 72 is additionally internally threaded so as to receive an externally threaded fluid nozzle 74, which is fixedly attached to high-pressure tubular conduit 58 via an integral collar 76, and securing nut 60; when tightly secured, collar 76 flushly abuts bolt end portion 20.

In assembling the fastening device of the second embodiment, t-bolt 12 is inserted through elongated openings 30 and 31 of the respective casings walls, all similar to the fastening procedure outlined with respect to the first embodiment of the invention, discussed heretofore. It will be apparent that flange 28 will be guided within annular shoulder 36, bladder 68 also being guided within shoulder 36 and abutting the interior face of end portion 40 of shoulder 36 upon the complete insertion of the bolt 12 within the casing walls.

First securement nut 44 is then threadingly secured to bolt end portion 16, at the conclusion of which high-pressure tubular conduit 58, with its attendant nozzle and collar sub-assembly 74 and 76, is threadingly received within flared insert 72 located within the bolt end portion 20. Pressurized fluid may then be conducted via conduit 58, nozzle 74, and fluid passageway 48, into expansible bladder 68, the fluid causing bladder 68 to expand and exert consequent pressure against end portion 40 of shoulder 36 and flange 28 of bolt 12 so as to cause a longitudinal elongation of the bolt 12. Upon attaining the desired amount of elongation, second securement nut 46 is threadingly secured upon bolt end portion 20 until it abuts the annular end portion 38 of contact supporting shoulder 36, at the conclusion of which the pressurized fluid may be withdrawn. In the now well-known mode, withdrawl of the pressurized fluid permits the bolt 12 to contract somewhat, thereby resulting in the desired shrink fitting of the fastening device relative to the turbine or pump casing walls.

Thus, it may be seen that the fastening device of the present invention has important advantages over the known prior art structures in that the fastening device attains its desired shrink fitting together of the various structural components without creating undesirable attendant expansions with its consequent stresses which tend to deleteriously affect the structural soundness of the assembled structure. In addition, operational costs are drastically reduced in that with the systems of the present invention, the source of power utilized to accomplish the shrink fitting together of the structural components, i.e., the pressurized fluid, unlike those prior art systems utilizing electric power, may be recycled and reused in subsequent assembly operations.

Obviously, many modifications and variations of the present invention are possible in light of the above teachings. It is to be understood, therefore, that within the scope of the appended claims the present invention may be practiced otherwise than as specifically described herein.

Accordingly, what is claimed as new and desired to be secured by Letters Patent of the United States is:

1. A fastening device comprising:
   an elongated cylindrical bolt having first and second portions of different diameters and having a circular flange integrally formed therewith and extending radially outward near one end of the bolt but spaced therefrom to define said second diameter portion, said bolt being capable of insertion through two components to be fastened together;

first external thread means disposed upon said one end of said elongated bolt adjacent said circular flange;
   a first securement nut for threaded engagement with said first external thread means;
   an annular shoulder member having a flat edge at one end, an inner diameter substantially equal to the diameter of said circular flange and a radially inwardly extending end face at its other end which is parallel to said flat edge, said end face having a central opening of substantially the same diameter as said first diameter portion of said bolt, whereby upon insertion of the other end of said bolt therethrough, said first securement nut may be tightened to forceably engage the one flat edged end of said shoulder member to cause the opposite and parallel end face thereof to be secured against one of the said components being fastened together;
   annular fluid chamber means being defined by said first diameter portion and one annular face of said circular flange of said elongated bolt and by said shoulder member;
   fluid passageway means located internally of said bolt at said one end thereof and connected to an external source of fluid and being in communication with said fluid chamber means for conducting fluid from said source into said fluid chamber;
   second external thread means disposed upon the other end of said elongated bolt; and
   a second securement nut for threaded engagement with said second external thread means.

2. A fastening device as set forth in claim 1, wherein said bolt contains a plurality of O-rings located on the circumferences of said first and second diameter portions of said bolt in contact with said annular shoulder member, whereby the O-rings operate as static seals preventing the seepage of fluid from said fluid chamber to other parts of the device.

3. A fastening device as set forth in claim 1, further comprising a flexible, expansible bladder disposed in said fluid chamber means.

4. A fastening device as set forth in claim 3, wherein said bladder has a sleeve integrally connected thereto and surroundingly engaging said fluid passageway means.

* * * * *